No. 892,723. PATENTED JULY 7, 1908.
D. H. HAYWOOD.
SPEEDOMETER.
APPLICATION FILED SEPT. 8, 1906.
2 SHEETS—SHEET 1.
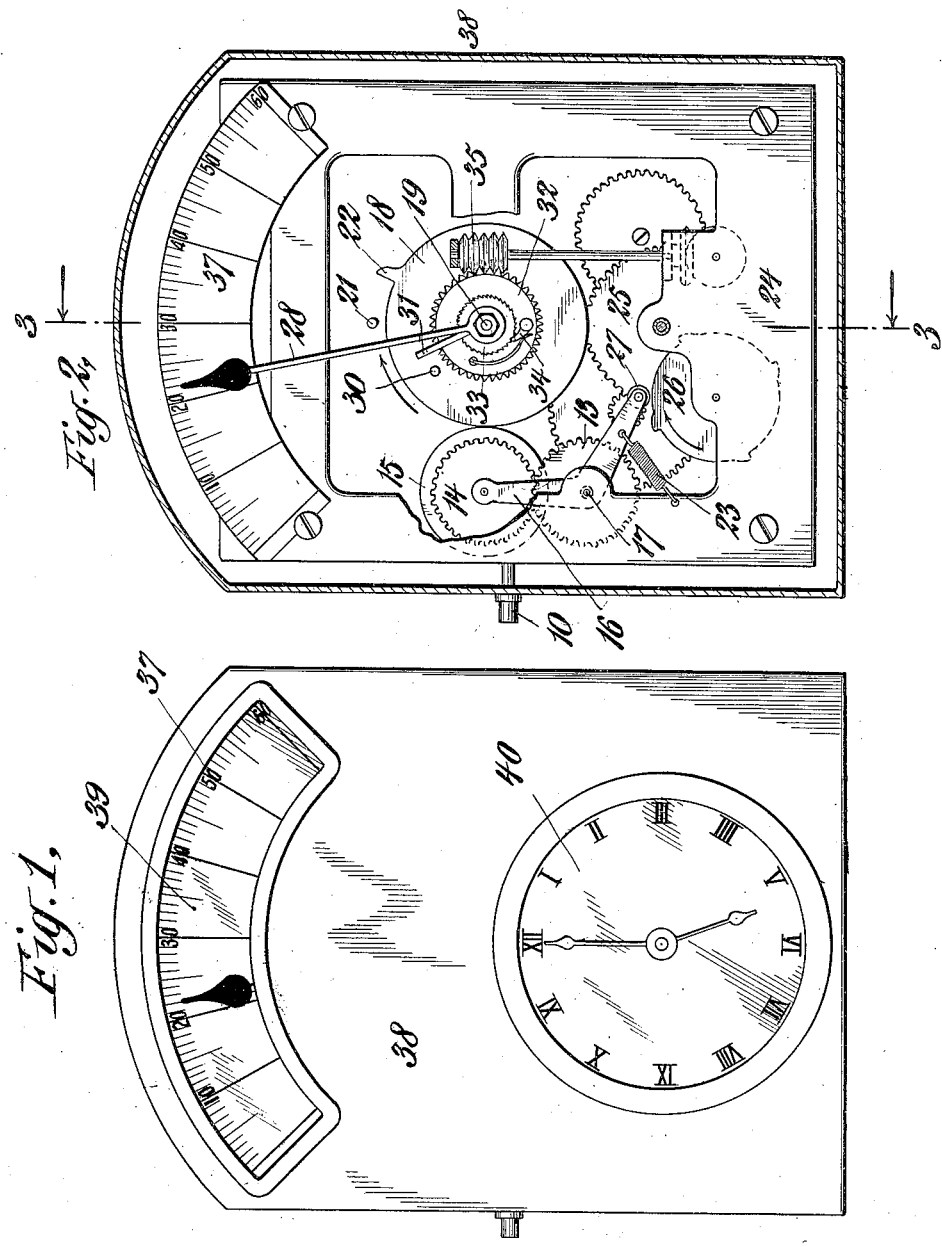

No. 892,723. PATENTED JULY 7, 1908.
D. H. HAYWOOD.
SPEEDOMETER.
APPLICATION FILED SEPT. 8, 1906.
2 SHEETS—SHEET 2.
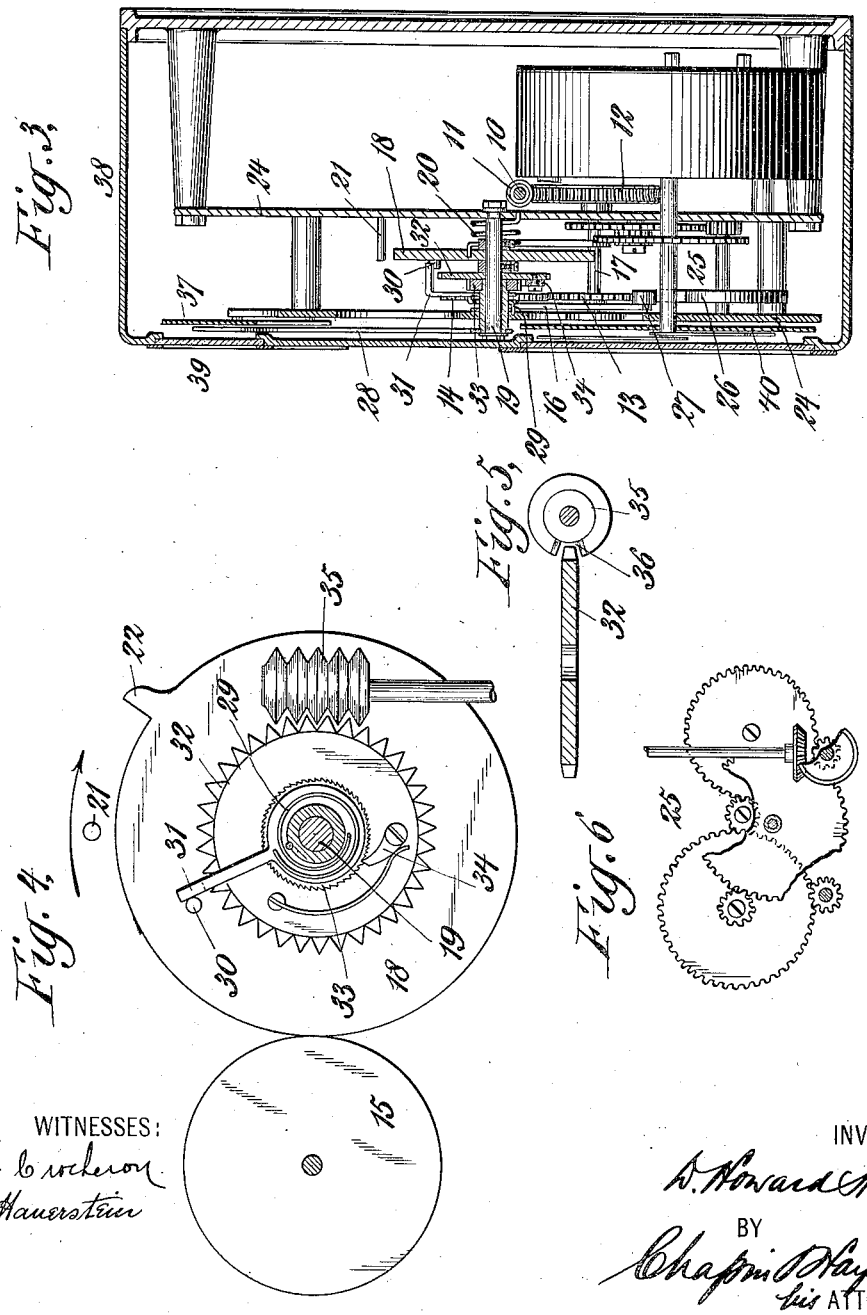
WITNESSES:
INVENTOR
BY
ATTORNEYS ic
UNITED STATES PATENT OFFICE.

DANIEL HOWARD HAYWOOD, OF NEW YORK, N. Y., ASSIGNOR TO JOSIAH M. FISKE, OF NEW YORK, N. Y.

SPEEDOMETER.

No. 892,723.

Specification of Letters Patent.

Patented July 7, 1908.

Application filed September 8, 1906. Serial No. 333,751.

*To all whom it may concern:*

Be it known that I, DANIEL HOWARD HAYWOOD, a citizen of the United States of America, and a resident of the city, county, and State of New York, have invented certain new and useful Improvements in Speedometers, of which the following is a specification, reference being had to the accompanying drawings, forming a part thereof.

My invention relates to improvements in speedometers, and particularly to speedometers adapted to be employed for indicating the speed of moving vehicles.

The particular class of speedometers to which my present invention relates is that class in which distance intervals are measured during predetermined intervals of time, the speed at which the distance is traveled during such intervals of time being successively indicated in the device; and the main objects of my invention are to improve and simplify instruments of this character, to render the operation thereof more positive and accurate, and to provide that the time mechanism shall be required to do but a minimum of work.

To these ends my invention consists in certain novel features of construction and combination of parts, and, in order that my invention may be fully understood, I will describe in detail an embodiment thereof as illustrated in the accompanying drawings, and will then point out the novel features in the claims.

In the drawings: Figure 1 is a view in front elevation of an instrument constructed in accordance with my invention. Fig. 2 is a similar view with the front of the casing removed and a part of the frame broken away. Fig. 3 is a view in central vertical section through the instrument, the section being taken substantially upon the line 3—3 of Fig. 2. Fig. 4 is a detail view on an enlarged scale of certain parts of the instrument including the driving and driven wheels, the stop wheel, the rotative latch, and other co-related and co-acting parts. Fig. 5 is a view at right angles thereto, showing the relation between the rotative latch and the stop wheel. Fig. 6 is a detail view of a clock train employed.

The distance measuring mechanism comprises a shaft 10, which may be connected in the usual or any desired manner with one of the wheels of the vehicle whose speed is to be measured, or with any other part which rotates proportionately to the distance covered,—a worm 11 secured upon said shaft, a worm wheel 12 engaged by said worm 11, a spur gear 13 secured to rotate with said worm wheel 12, another spur gear 14 in mesh with said spur gear 13, and a friction driving element 15 mounted to rotate with said spur gear 14.

The spur gear 14 and driving element 15 are mounted to rotate in a swinging framework 17 pivotally mounted upon the axle of the spur gear 13 and worm wheel 12. The driving element 15, which is here shown in the form of a friction disk, has its periphery normally in contact with the periphery of a driven member 18. This driven member is mounted to rotate freely upon a central stud 19, and a spring 20, secured at one end to the said member 18, and at the other end to a stationary part of the instrument, tends to normally return the said element to a normal position, such movement being in a direction opposite to the direction in which the arrows point in Figs. 2 and 4 of the drawings.

A stationary abutment 21 is arranged in the path of movement of a shoulder 22 upon the member 18, said abutment and shoulder forming a limiting stop, which limits the return movement of the member 18 under the influence of the spring 20, as will be well understood. The member 18 is driven in the direction of the arrows in the drawings for so long a time as the driving member 15 is in contact therewith, and the said driving member is kept normally in contact therewith by means of a spring 23, which is connected at one end with the swinging frame, and, at the other end, with a part of the main frame 24 of the instrument. At predetermined intervals of time the said frame 16 is rocked upon its support so as to momentarily release the said driving member 15 from the driven member 18, to thereby allow the said driven member to return to its normal position, as above stated. This movement of the rocking frame is brought about by means of a cam wheel 26, the cam projections of which intermittently engage a cam follower 27 upon the swinging frame 16, the said cam wheel 26 being driven by and timed from a clock train 25 which constitutes a time mechanism. It will then be readily understood from the foregoing that the driven member 18 is driven in the direction of the arrow a distance proportional to the extent of rotation of the shaft 10 for successive predetermined intervals of time, the said driven member being permitted to return to a zero position at the end of each said interval of time. For the purpose of indicating the extent of rotative movement of the member 18, I have provided an indicator 28 which is mounted loosely upon the stud 19, but provided with a spring 29 which normally tends to return it to a zero position. The driven member 18 has a stud or projection 30 which is adapted to engage an abutment 31 carried by the said indicator 28, so that, as the driven wheel moves in the direction of the arrow in the drawings, it may engage the said indicator and move it in such direction. When first starting up, the abutment 31 will rest against the stud 30, so that the indicator 28 will partake of all the movement of the same member 18. I provide means, however, for preventing the return movement of the indicator 28 when the said member 18 returns to its initial position, said means comprising a stop wheel 32 mounted loosely upon the stud 18, a ratchet wheel 33 secured fast to the indicator 28, a spring pressed pawl 34 carried by the stop wheel 32 and engaging the teeth of the ratchet wheel 33, and a rotative latch 35 which normally engages the teeth of the stop wheel 32.

The ratchet and pawl connection between the indicator 28 and the stop wheel 32 holds the indicator 28 positively against rearward movement with respect to the said stop wheel, but permits free forward movement thereof. The stop wheel is normally held against movement in either direction by the rotative latch 35, but the said rotative latch is provided with an opening or notch 36 (see Fig. 5) which, in one position, releases the latch from engagement with the teeth of the stop wheel 32, as will be well understood by reference to the drawings. The rotative latch is driven from the clock train 25, and thus is timed in direct relation to the timing of the cam 26. The said latch is arranged to release and again engage the stop wheel 32 just prior to the tilting movement given to the frame 16 by the cam 26, and hence the release and return movement of the member 18. Thus, if the speed of the vehicle is being reduced and the member 18 is hence traveling a shorter distance in the direction of the arrow during the predetermined time interval, the indicator 28, which has been held against return movement, will be allowed to drop back until stopped by the pin 30 upon the member 18, and will be again held against further return movement by the rotation of the latch 35 to reëngage said stop wheel, just prior to the moment the member 18 is permitted to return to its normal position. Any forward movement, however, which is given to the member 18 in the brief space of time between the moment the latch 35 again picks up and holds the stop wheel 32 and the time the member 18 is released, will be readily partaken of by the indicator 28, because of the ratchet and pawl connection 33, 34; and, for the same reason, should the speed of the vehicle be suddenly increased, forward movements of the indicator 28 will be in no wise opposed when the pin 30 engages the abutment 31 prior to the release movement of the rotative latch 35.

The indicator 28 is arranged to register with a graduated scale 37, which is supported by the frame 24 of the instrument, the said graduated scale so proportioned as to indicate speed in proportion to the distance traveled during the predetermined time intervals. Thus, the instrument is arranged to constantly indicate successive rates of speed at the end of each time interval, the indicator being held steady during substantially all of each of the said time intervals, whereby a reading may be readily and accurately taken at any time. The time intervals may be quite short—the shorter the intervals the greater the accuracy of the instrument.

It will be noted that the mechanism in its operation requires but a minimum of power, especially the parts operated from the time mechanism. The rotative latch will positively hold the stop wheel 32 against movement, yet the holding of the stop wheel against such movement offers practically no resistance to the rotative movement of the said latch, such resistance being longitudinal with respect to the axis of the said latch, and not transverse thereto. The tilting of the frame 16 takes place only momentarily after certain intervals of time, and requires but a minimum of power for its operation.

I have shown a casing 38 as inclosing the mechanism above described, said casing being provided with a window 39 through which the scale 37 may be seen, and I have shown a clock face 40, the hands of which are driven by the time mechanism 25, whereby the instrument may conveniently indicate time as well as speed of the vehicle.

What I claim is:

1. A speedometer comprising a driven actuating member, driving means in normal driving relation therewith, means for returning the actuating member to a normal zero position, and means for releasing said member from engagement with the driving means to permit such return movement at predetermined intervals of time, a spring returned indicator adapted to be engaged directly by said actuating member, a stop wheel, means for positively locking said stop wheel against movement and for momentarily releasing same at predetermined intervals, and a connection between said stop wheel and said indicator, said connection permitting movement between them in one direction, but preventing such movement in the other.

2. A speedometer comprising a driven actuating member, driving means in normal driving relation therewith, means for returning the actuating member to a normal zero position, and means for releasing said member from engagement with the driving means to permit such return movement at predetermined intervals of time, a spring returned indicator adapted to be engaged directly by said actuating member, a stop wheel arranged to be free at all times from engagement with said actuating member, but having a connection for engagement with said indicator in one direction of rotation, and means intermittently operated for holding and releasing said stop wheel.

3. A speedometer comprising a spring returned actuating wheel, a freely mounted stop wheel, and a spring returned indicator, all mounted concentrically with respect to each other, means carried by said actuating wheel to engage said indicator in direct free abutting relation therewith, a ratchet and pawl connection between said indicator and said stop wheel, and means intermittently operated for alternately holding and releasing said stop wheel.

4. A speedometer comprising a driven actuating member, driving means in normal driving relation therewith, a spring for returning the actuating member to a normal zero position, and means for releasing the said member from its engagement with the driving means to permit said return movement at predetermined intervals of time, a spring returned indicator adapted to be engaged by said actuating member, a stop wheel, a connection between said stop wheel and said indicator, and means for normally holding and momentarily releasing said stop wheel.

5. A speedometer comprising a driven actuating member, driving means in normal driving relation therewith, a spring for normally returning the actuating member to a zero position, and means for releasing the said member from its engagement with the driving means to permit said return movement at predetermined intervals of time, a spring returned indicator adapted to be engaged by said actuating member, a stop wheel, a ratchet and pawl connection between said stop wheel and said indicator, and means for normally holding and momentarily releasing said stop wheel.

6. A speedometer comprising means for successively measuring distance during units of time, provided with a spring returned indicator, a stop wheel therefor, a ratchet and pawl connection between said stop wheel and said indicator, holding means for said stop wheel, and means for momentarily releasing operative engagement of said holding means with said stop wheel.

7. A speedometer comprising means for successively measuring distance during units of time, provided with a spring returned indicator, a stop wheel therefor, a ratchet and pawl connection between said stop wheel and said indicator, holding means for said stop wheel, and a rotative latch normally engaging said stop wheel, provided with a cutaway portion which in the rotation of the said latch, causes momentarily disengagement thereof from the stop wheel.

8. A speedometer comprising a driven actuating member, driving means in normal driving relation therewith, a spring for normally returning the actuating member to a zero position, and means for releasing the said member from its engagement with the driving means to permit said return movement at predetermined intervals of time, a spring returned indicator adapted to be engaged by said actuating member, a stop wheel, a ratchet and pawl connection between said stop wheel and said indicator, a rotative latch normally engaging said stop wheel, provided with a cut-away portion which in the rotation of said latch causes momentarily disengagement from the stop wheel, and means, timed with relation to the said releasing means, to cause such disengagement and the reëngagement thereof, just prior to a said releasing operation for the actuating member.

9. A speedometer comprising actuating means operated in accordance with distance traveled, and a spring returned indicator therefor, time mechanism controlling said actuating means, a stop wheel 32, a ratchet and pawl connection between said actuating means and said stop wheel 32, and a rotative latch 35, having a cut-away portion 36, said rotative latch operated by said time mechanism.

D. HOWARD HAYWOOD.

Witnesses:
 HARRY GOSS,
 J. WARES BOYCE.